(12) United States Patent
Mane et al.

(10) Patent No.: US 11,954,505 B2
(45) Date of Patent: Apr. 9, 2024

(54) DISTRIBUTED DATA STORAGE SYSTEM WITH DORMANT HARDWARE ACTIVATION

(71) Applicant: Seagate Technology LLC

(72) Inventors: Hemant Vitthalrao Mane, Pune (IN); Jason Matthew Feist, Minneapolis, MN (US); Praveen Viraraghavan, Chicago, IL (US); Robert W. Dixon, Longmont, CO (US); Marc Timothy Jones, Longmont, CO (US); Steven Williams, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 63 days.

(21) Appl. No.: 17/886,240

(22) Filed: Aug. 11, 2022

(65) Prior Publication Data
US 2024/0053993 A1 Feb. 15, 2024

(51) Int. Cl.
*G06F 9/445* (2018.01)
*G06F 9/48* (2006.01)

(52) U.S. Cl.
CPC .......... *G06F 9/4451* (2013.01); *G06F 9/4881* (2013.01)

(58) Field of Classification Search
CPC ............................. G06F 9/4451; G06F 9/4881
See application file for complete search history.

(56) References Cited

U.S. PATENT DOCUMENTS

| 10,248,791 | B2 | 4/2019 | Pappachan et al. |
| 10,601,593 | B2 | 3/2020 | Antonopoulos et al. |
| 10,673,638 | B2* | 6/2020 | Gulati ................... G06F 21/572 |
| 2020/0272744 | A1 | 8/2020 | Kaushik et al. |
| 2021/0011741 | A1* | 1/2021 | Bartfai-Walcott .... H04L 9/3247 |
| 2021/0203496 | A1* | 7/2021 | Cariello .................. G06F 21/79 |

* cited by examiner

*Primary Examiner* — Terrell S Johnson
(74) *Attorney, Agent, or Firm* — Hall Estill Law Firm

(57) ABSTRACT

A data storage system may connect a host to a device and a hardware module that are utilized to satisfy at least one host-generated data access request to the device. A portion of the device is set as dormant by the hardware module prior to identifying an origin of the device with the hardware module during the satisfaction of the at least one host-generated data access request. In response to the identified origin, the previously dormant portion of the device is activated and subsequently utilized to execute a task assigned by the hardware module.

20 Claims, 4 Drawing Sheets

US 11,954,505 B2

DISTRIBUTED DATA STORAGE SYSTEM WITH DORMANT HARDWARE ACTIVATION

SUMMARY

Embodiments of the present disclosure are generally directed to optimization of system performance in response to a detected identification of the origin of system hardware.

Various embodiments of a distributed data storage system connect a host to a device and a hardware module prior to identifying an origin of the device with the hardware module. In response, a previously dormant hardware aspect of the device is activated and utilized to execute a task assigned by the hardware module.

A distributed data storage system, in some embodiments, connects a host to a device and a hardware module that are utilized to satisfy at least one host-generated data access request to the device. A portion of the device is set as dormant by the hardware module prior to identifying an origin of the device with the hardware module during the satisfaction of the at least one host-generated data access request. In response to the identified origin, the previously dormant portion of the device is activated and subsequently utilized to execute a task assigned by the hardware module.

In other embodiments of a distributed data storage system, a host is connected to a device and a hardware module to satisfy at least one host-generated data access request with the device. A portion of the device is throttled by the hardware module to less than an operational maximum of the device. The identification of an origin of the device with the hardware module during the satisfaction of the at least one host-generated data access request triggers the unthrottling the device to provide the operational maximum while executing a task assigned by the hardware module.

These and other features which may characterize various embodiments can be understood in view of the following detailed discussion and the accompanying drawings.

DETAILED DESCRIPTION

Embodiments of a data storage system are generally directed to detecting an origin of system hardware and intelligently utilizing the hardware to carry out system tasks and data access requests.

The utilization of more sophisticated data storage system has allowed greater amounts of digital content to be moved, stored, and retrieved. Increasing popularity of modular hardware that are distributed to assorted, remote physical locations can increase the reliability and performance of data storage, and retrieval. However, modern distributed data storage systems can suffer from heightened complexity, particularly over time, that degrade system performance and jeopardize the reliability of data accesses.

As greater volumes of data have been processed by modern distributed data storage systems, data handling protocol and hardware has evolved to provide increasing capabilities. The advent of peripheral component interconnect express (PCIe) allowed improved connectivity in a distributed data storage system that evolved into non-volatile memory express (NVMe) that provides sophisticated parallel signal pathways that greatly increases the capability of a system to service relatively large volumes of data access requests. The use of relatively fast solid-state data storage devices has heightened the capabilities of data storage to complement NVMe protocol.

Yet, the capability of a distributed data storage system to handle large volumes of data can be degraded as various system tasks and activities present performance bottlenecks. That is, greater data handling capabilities have coincided with a general venerability to background system tasks that are needed to maintain the reliable operation of assorted data storage devices and data distributing components. It is noted that throughout the present disclosure, assorted inefficiencies of a distributed data storage systems are characterized, generally, as bottlenecks where performance degradation is exacerbated as system activity volume increases. Accordingly embodiments of a distributed data storage system are directed to intelligent utilization of hardware to provide heightened performance when known hardware origin is identified.

Figure 1:
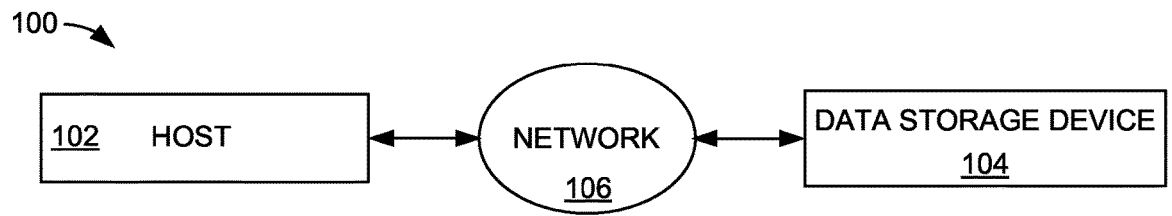
FIG. 1 depicts a block representation of an example data storage system in which various embodiments can be practiced.

In FIG. 1, a block representation of an example distributed data storage system 100 is illustrated. While not limiting, the data storage system 100 connects a host 102 to a data storage device 104 via a network 106. A host 102 can be any intelligent node that can generate data access requests that are satisfied by the intelligence of the data storage device 104. It is noted that the network 106 can be any individual, or combination, of wired and/or wireless signal pathways that allow the data storage device 104 to in nearly any physical location on the planet to store data generated by the host 102.

Figure 2:
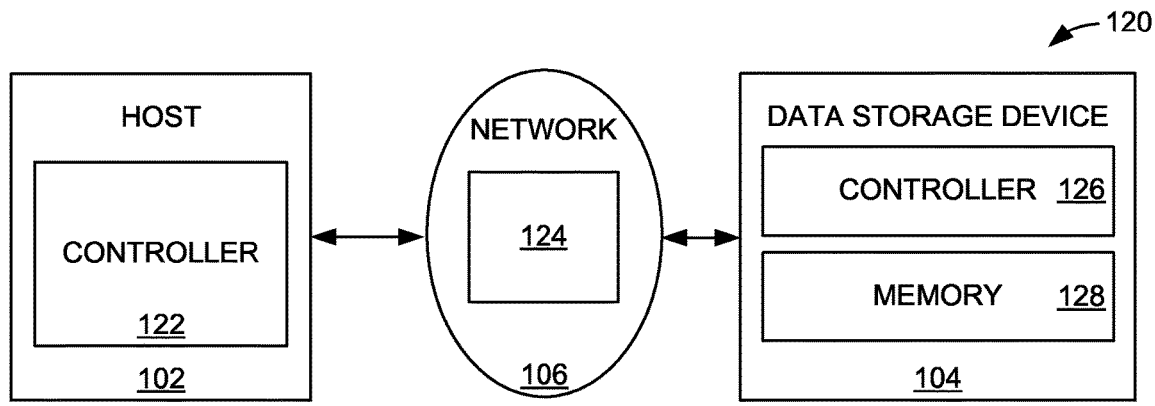
FIG. 2 depicts a block representation of portions of an example data storage system arranged in accordance with some embodiments.

FIG. 2 depicts a block representation of portions of an example distributed data storage system 120 arranged in accordance with various embodiments. A number of hosts 102 can be connected to a number of data storage devices 104 via a network 106 that consists of at least one centralized intelligence that schedules and distributes various data and system activities to selected data storage devices 104 for execution.

Although not required or limiting, each host 102 can have a controller 122 that generates data and data access requests that are distributed to selected data storage devices 104 by a network controller 124 and subsequently satisfied by a local device controller 126. The ability to interconnect and utilize numerous different data storage devices 104 allows increasing numbers of hosts 102 to be serviced concurrently. The use of sophisticated data management protocol, such as NVMe, can further take advantage of the concurrent utilization of assorted data storage devices 104 to provide relatively high data access performance.

However, the flow of data, data access requests, and system tasks through the upstream network components, such as servers, switches, and nodes employing the network controller 124, can experience performance bottlenecks over time. Particularly in high data access request volume conditions employing NVMe protocol, the network components can be overwhelmed and consequently provide reduced data access performance to one or more hosts 102. The addition of assorted memory and data tasks that are necessary to maintain data and memory reliability further exacerbates the performance degradation associated with high volume conditions.

Figure 3:
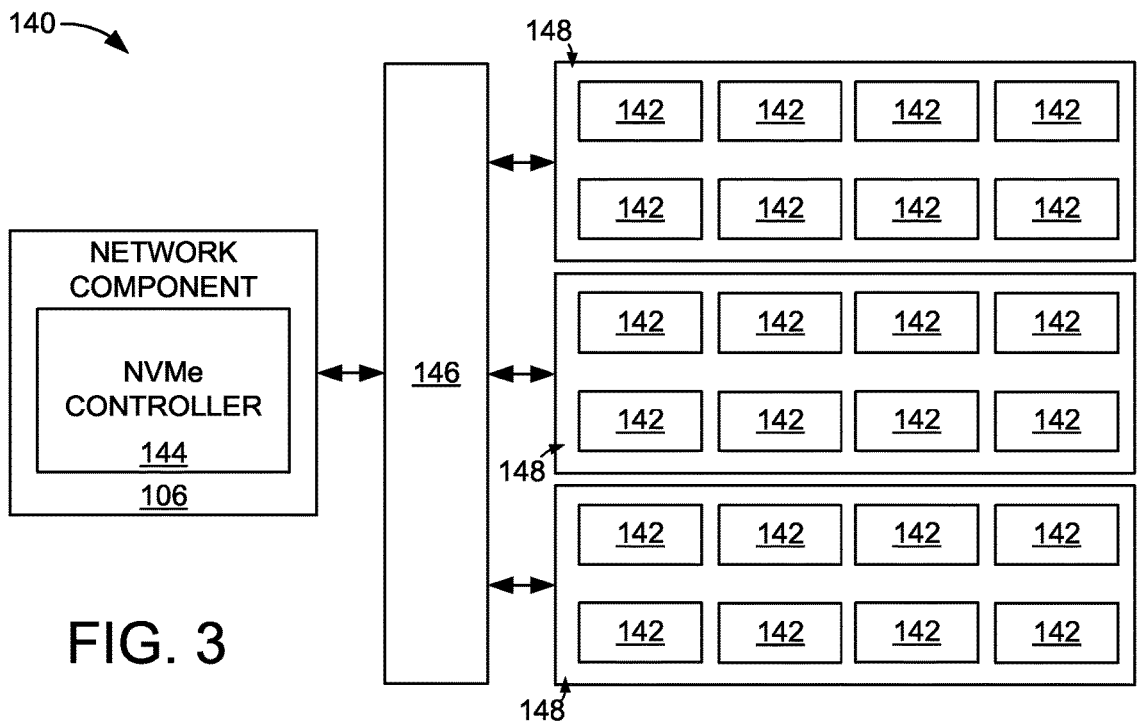
FIG. 3 depicts a block representation of portions of an example data storage system configured and operated in accordance with assorted embodiments.

FIG. 3 depicts a block representation of portions of another example distributed data storage system 140 configured in accordance with some embodiments to employ an NVMe protocol to satisfy host-generated data access requests to, and from, various solid-state memories 142 resident in one or more data storage devices. The system 140 has an NVMe controller 144 that arranges a number of data queues 146 and namespaces 148 to accommodate the data handling capabilities of the NVMe protocol.

Generally, NVMe is a communications interface and driver that defines a command set and feature set for PCIe-based solid-state drives (SSDs) with the goals of increased and efficient performance and interoperability on a broad range of enterprise and client systems. NVMe was designed for SSD as a layer between the device driver and the PCIe device, standardizing the rules with emphasis on scalability, low latency, and security. NVMe communicates between the storage interface and the System CPU using high-speed PCIe sockets, independent of storage form factor. Input/Output tasks performed using NVMe drivers begin faster, transfer more data, and finish faster than older storage models using older drivers, such as serial ATA (SATA) SSDs. Because it was designed specifically for SSDs, NVMe is becoming the new industry standard for both servers in the data centers and in client devices like laptop, desktop PCs and even next gen gaming consoles.

The standard developed to allow modern SSDs to operate at speeds flash memory is capable of, a sharp advantage with faster read-write. The NVMe SSD enables the flash memory to run directly through the PCI Express (PCIe) serial bus interface as it offers high bandwidth due to being directly attached to the CPU rather than function through the limiting SATA speeds. As SSDs superseded the slower HDDs as primary storage, a fast interface was required to achieve optimal use of the quicker speed capabilities.

That is, NVMe is a technological depiction of the bus, the memory component (SSD) uses to communicate with the computer, and not exactly a new type of memory. A communications interface and driver that outlines a command set and feature set of PCIe based SSD. NVMe technology is available in a number of form factors such as the PCIe card slot, M.2, and U.2, but with all form factors, it directly connects electrically to the motherboard via the PCIe rather than SATA connection.

NVMe, in some configurations, can support multiple I/O queues, up to 64K with each queue having 64K entries. Legacy SAS and SATA can only support single queues and each can have 254 & 32 entries respectively. The NVMe host software can create queues, up to the maximum allowed by the NVMe controller, as per system configuration and expected workload. NVMe supports scatter/gather IOs, minimizing CPU overhead on data transfers, and even provides the capability of changing their priority based on workload requirements. The interface is designed for high scalability and NVM independence to enable next-generation technologies to deliver sustained 4 KB of random accesses over 1 million I/Os per second, which translates to 1 µs or less per command.

NVMe doesn't need the intervening host bus adapter (HBA) and can connect to a higher number of PCIe lanes. A SAS lane runs at 12 Gb per second, which contracts to just about 1 GB per second after overheads. As well a SATA lane drops half of that, while PCIe lane runs at 8 Gb per second, or approximately 3.3 Gb/s for four lanes with overhead, and a standard NVMe SSD can be attached to four such lanes, supporting up to 4 Gb per second. So, a SATA SSD runs at 0.5 GB per second and an NVMe SSD at around 3 Gb per second, which is six times higher throughput.

It is noted that NVMe is not affected by the ATA interface constrictions as it sits right on the top of the PCI Express directly connected to the CPU. That results in four times faster Input/Output Operations Per Second (IOPs) rivaling the fastest SAS option available. NVMe can deliver sustained read-write speed of 2000 MB per second. NVMe enables drives to benefit from the same "pool" of lanes that directly connect to the CPU, which offers scalable performance by going beyond the conventional four lanes found in most PCIe SSDs and utilize them for added performance. PCIe sockets transfer more than 25 times more data than their SATA equivalent.

However, NVMe storage can have performance issues that result in added cost and inconvenience. For instance, traditional storage controllers, such as flash or HDD controllers, can only handle low levels of I/O processing and create latency and cap performance of NVMe systems. Additionally, the sheer number of possible concurrent commands being processed simultaneously risks inefficiency, complexity, excess power consumption, and unwanted processing. Hence, simplification and system optimization that allows for efficient and adaptable NVMe operation can enhance the capabilities and performance of SSDs both alone and in pooled data center environments.

With the capabilities of NVMe, it can be appreciated that the concurrent use of multiple lanes can provide increased performance while suffering from added complexity that jeopardizes the security and reliability of data, at times. As an example, intelligent operation of queues 146 that temporarily hold data before storage into selected logical namespaces 148 can provide maximum operational performance, during some volumes of host-generated data access requests, but have operational bottlenecks that slow data access, delay data rebuilding, and/or delay security operations on data and/or memory during heightened volumes of requests.

Such request dependent performance can be exacerbated by system tasks that function to maintain the reliability of memory and data stored in the memory. That is, the generation, scheduling, distribution, and satisfaction of system tasks, such as security, RAID, error correction code, firmware, device initialization, data mapping, and metadata operations, can complicate upstream network and/or NVMe controllers 144 to produce one or more performance bottlenecks that slow, delay, and/or cancel completion of system tasks and/or host-generated data access requests.

While the identification of performance bottlenecks can allow for intelligent diversion of system tasks downstream to selected data storage devices for execution, the processing of system tasks downstream can fail to mitigate a bottleneck, particularly during high data access request volume conditions. Hence, assorted embodiments are directed to taking advantage of the configuration of various system 140 components to optimize operational efficiency and mitigate the impact of performance bottlenecks over time.

Accordingly, embodiments are directed to identifying the manufacturing origin of system components and altering operational parameters to components with known, trusted origins to maintain at least system performance, such as latency, error rate, and overall time to completion, for host-generated data access requests, which provides seamless system operation despite dynamic volumes of activity involving data and/or system memory 142. In other words, the assorted issues associated with NVMe network traffic complexity and inefficiency has prompted the reconfiguration of hardware that has a known, trusted origin to prevent performance bottlenecks and maintain system performance despite relatively high volumes of system activity.

Figure 4:
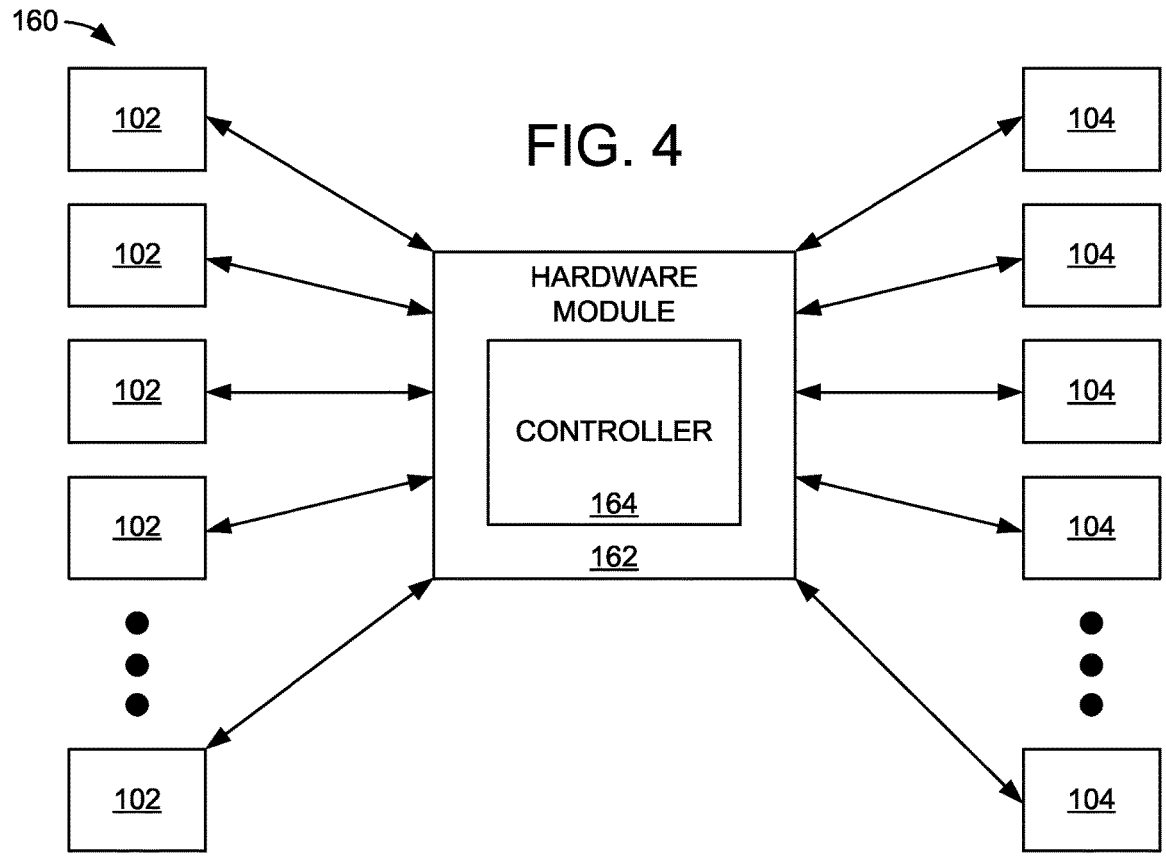
FIG. 4 depicts a block representation of portions of an example data storage system utilized in accordance with various embodiments.

FIG. 4 depicts a block representation of portions of an example distributed data storage system 160 utilized in accordance with various embodiments. Connection of a hardware module 162 to at least one host 102 and at least one data storage device 104 allows for recognition of the manufacturing origin of the data storage device 104. That is, a controller 164 of the hardware module 162 can passively and/or actively identify an origin of a connected device, such as a manufacturer of the device prior to release to an end-user or an original version of firmware operating on the device. It is contemplated that a device's origin corresponds to the manufacturer of some device hardware, such as the controller, memory, bus, motherboard, or system-on-chip (SoC).

The connection of familiar data storage components, such as data storage devices, network controllers, and network nodes allows for the use of trusted data and/or processing channels/lanes. Such dedicated aspects can be employed, in some embodiments, for selected system tasks, such as cryptographic operations, error correction code assignment, error correction code utilization for data rebuilding, RAID operations, firmware upgrades, security operations, and device initializations. The dedication of a channel/lane for a selected task can enhance security as well as increase operational efficiency as complex operations can be conducted exclusively. The ability to dedicate a channel/lane for selected tasks further allows NVMe protocol to be employed without jeopardizing data or memory security or process flow.

Recognition of a device's origin, in other embodiments, allows dormant hardware to become active. For instance, supplemental controllers, cache, switches, and/or connections can be activated and utilized without concern for incompatibility, firmware alterations, or security mismatches. It is contemplated that activated hardware can be dynamically assigned functions and tasks by the hardware module 162 in response to changing operational conditions. The use of NVMe protocol for activated components, such as an NVMe switch, can provide enhanced capabilities and/or performance that would otherwise not be capable with non-trusted components with unknown origins and/or operational configurations.

Through the passive recognition of device manufacturing origin, component initializations and security protocol can be streamlined. That is, a trusted, known origin component allows some, or all, of a component's initialization to be skipped, ignored, or abbreviated. Knowing that a component is trusted and/or has a common operating/security/communication protocol allows the component to be utilized more efficiently than if normal component initializations were conducted. The initialization-less component connection can be employed for dedicated NVMe operation that is unimpeded by initializing the component into the system, building a security profile, and loading firmware.

Other embodiments enabled by the recognition of trusted component with a known origin involve sharing data storage functionality that would, otherwise, require re-initializing a non-trusted component to have matching operational and security protocol. Particular embodiments can be directed to shared RAID configurations/functions, error correction, security authentication, drivers, processing, or caching. Sharing functionality among components with known origins can be specifically optimal in distributed systems that employ data storage devices from different brands. For example, known origin components can identify one another and establish optimized functionality independent, and potentially autonomously, of unknown component origins, such as NVMe data access request execution, queue management, garbage collection, or metadata protocol.

The intelligence and efficiency provided by the circuitry of the hardware module 162 allows for both passive and active evaluation of a system component 104 to identify and/or predict the component's origin. For instance, the hardware module 162 can passively monitor activity of a component 104 to predict and/or detect what manufacturer released the component 104, what firmware was initially installed on the component 104, and what hardware is present in the component 104, which can be generally characterized as the "origin" of the component 104. It is noted that "passive" evaluation of a component 104 is not limited to a particular procedure or timing, but can consist of evaluating operational parameters while the component 104 operates to complete other system tasks and/or host-generated data access requests. Conversely, "active" evaluation of a component 104 can consist of testing of the component 104 with test patterns of data and/or signals generated by the hardware module 162 to identify operational parameters and configurations that indicate the origin of the component 104.

Figure 5:
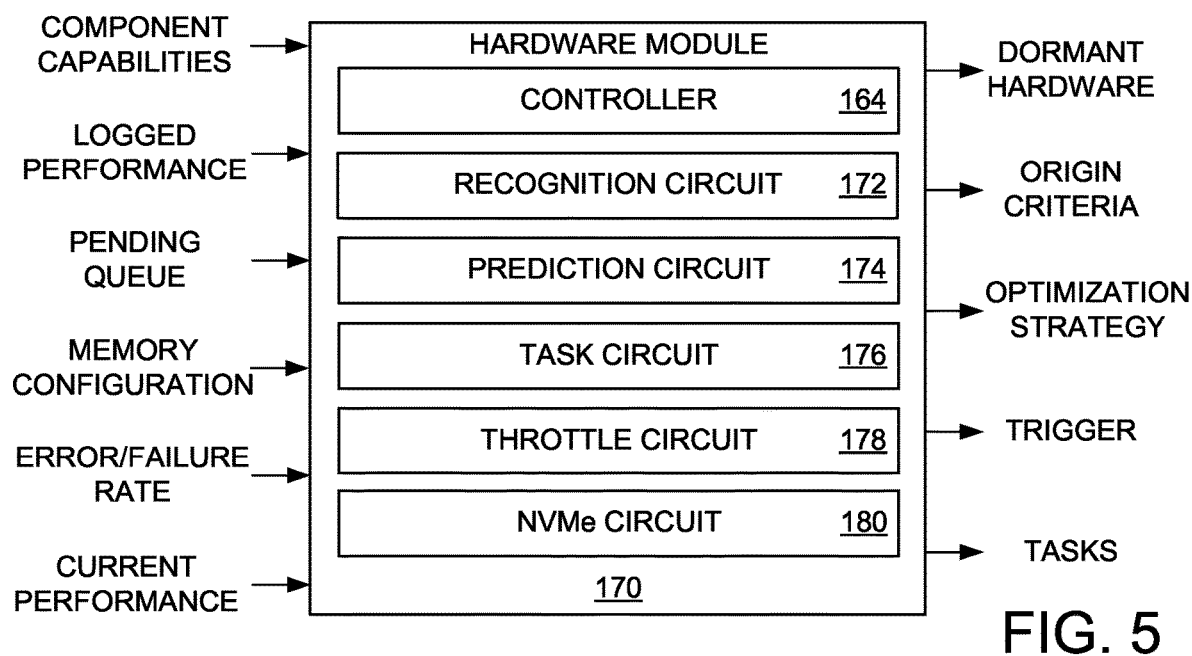
FIG. 5 depicts a block representation of an example hardware module capable of being employed in the data storage system of FIGS. 1-34.

FIG. 5 depicts a block representation of an example hardware module 170 that can be employed in a distributed data storage system in accordance with various embodiments. The module 170 can be configured as hardware resident in any aspect of a data storage system. As an example, the module 170 can be circuitry of a printed circuit board located alone and connected to assorted components of a system 120 or positioned within a component of the system 120, such as a host 102, network component 106, or data storage device 104.

A hardware module 170, in some embodiments, has a local controller 164 that processes input information, such as logged system activity, pending requests, system configurations, and component capabilities, to generate an optimization strategy that utilizes strategically selected aspects of the system to take advantage of known, trusted components to provide consistent and reliable data access performance over time. The module controller 164 can operate alone, or in conjunction with a recognition circuit 172 to passively, or actively, evaluate the operating parameters of a system component to determine an origin of the component.

Various embodiments of the recognition circuit 172 translate various input information about system data, hardware, configuration, operation, and performance to select between active and passive identification of the origin of system components. That is, the recognition circuit 172 can proactively generate tests and/or procedures to either passively identify a component's origin by evaluating selected operating characteristics, such as latency, input/output per second, average completion time, assigned error correction, and security protocol, or conduct at least one pattern of test signals/data generated by the recognition circuit 172 to actively determine the manufacturer and/or original firmware of the component. The ability to intelligently select between active identification and passive identification allows the hardware module 170 to balance time for identification of origin with amount of system processing resources utilized during identification.

It is noted that passive identification of a component's origin can involve the correlation of predetermined criteria generated by the hardware module 170 with operational characteristics and/or performance passively attained while the component is carrying out data access requests and system tasks. The predetermined criteria, in some embodiments, consists of operational characteristics that correspond with a component's origin, such as assigned metadata, mapping, error correction code, or encryption. As such, the hardware module 170, and recognition circuit 172, can maintain the criteria over time to ensure the accurate and efficient identification of a component's origin, which enables the hardware module 170 to optimize the utilization of dormant and/or throttled aspects of the system to take advantage of the known, trusted operating characteristics of the component.

While assorted embodiments select to actively, or passively, identify a component's origin, the hardware module 170 may, alternatively, translate system information into a forecasted component origin. For instance, the hardware module 170 may utilize a prediction circuit 174 to translate collected operational information into a predicted component origin, which provides a less accurate origin determination than active or passive origin identification, but with less processing requirements. The prediction circuit 174 can employ logged system data, model data from other data storage systems, and theoretical operational data to predict what operational activity of a system component indicates the component's origin, such as NVMe namespace assignment, caching scheme, security protocol, metadata assignment, or data encryption.

The use of the prediction circuit 174, in various embodiments, forecasts test patterns of data and/or system signals to increase the efficiency and/or accuracy of active component origin identification. It is contemplated that the prediction circuit 174 forecasts which hardware to throttle or deactivate into a dormant state without degrading average system performance over time, such as time to complete a data access request, error rate, or access latency. The ability of the hardware module 170 to adapt which hardware aspects of a system are dormant or throttled, from collected or predicted system activity, allows for efficient system dynamics that provide optimized utilization of connections with known, trusted components.

Although not required or limiting, known component origins can be utilized by the hardware module 170 to assign system tasks with a task circuit 176. By knowing, or intelligently predicting, the origin of a component, the hardware module 170 can divert system tasks, set by the task circuit 176, from upstream network components to downstream component for completion without jeopardizing the average performance of a device, namespace, or system as a whole. In other words, the origin of a component indicates the operational capabilities and deficiencies of the component, which allows the hardware module 170 to assign system tasks that can be completed by the component in conjunction with satisfaction of host-generated data access requests without degrading the average performance of a device, logical namespace, or complete system.

An assignment of a system task for completion by downstream data storage devices allows for optimization with the activation, or unthrottling, of hardware aspects of the system. A throttle circuit 178 can operate to complement the module controller 164 in generating and carrying out an optimization strategy that involves throttling hardware, such as a bus, port, channel, processor, die, plane, or memory cell, until a predetermined operational trigger that prompts unthrottled hardware operation. That is, embodiments of the hardware module 170 generate an optimization strategy with the throttle circuit 178 the prescribes what hardware to throttle, when to throttle the hardware, and when to unthrottled the hardware. As a result, an optimization strategy can utilize identified hardware origins for unthrottled execution of general and/or specific system activity, such as diverted system tasks and host-generated data access requests.

While not limiting, the throttling of hardware can involve artificially reducing operational performance of at least one parameter below an operational capacity. In other words, the hardware module 170, and optimization strategy, can keep hardware from operating at maximum operating performance, which can be characterized as throttling, until an origin of a system device is identified and the hardware is unthrottled for maximum performance to execute selected tasks, commands, and/or requests.

It is contemplated that some operational parameters of hardware are throttled while other parameters are unthrottled. For instance, delays, electrical power, and queued commands/requests can be manipulated and utilized to artificially prevent hardware operating parameters, such as latency, overall time to completion, and input/output per second (IOPS), from fulfilling maximum potential until a triggering event prompts unthrottled operation and satisfaction of maximum hardware potential. As another example, a channel queue and/or supplied power can be altered to artificially reduce the capability of the channel, or other connected hardware, until an unthrottled condition when maximum possible hardware capabilities are enabled and employed in accordance with an optimization strategy.

The ability to manipulate and throttle hardware operation in response to identified hardware origin allows for peak hardware performance when known, trusted hardware is present. Identified hardware origin may further allow for optimization of logical memory groupings and data handling protocol associated with NVMe. An NVMe circuit 180 of the hardware module 170 can provide the optimization strategy with dynamic configurations that take advantage of the known aspects of the hardware. For instance, an NVMe switch can be activated in response to an identified hardware origin, in accordance with an optimization strategy, to convert portions of a distributed data storage system to NVMe operation with logical namespaces and parallel command/request/data pathways.

The activation of logical and/or structural aspects of a system to provide NVMe operation that utilizes known operating capabilities of the identified hardware to provide optimized completion of data access requests and/or system tasks. Some embodiments of an optimization strategy have dynamic configurations prescribed by the NVMe circuit 180. A non-limiting example consists of changing namespace size, location, or execution order while some embodiments execute an optimization strategy to alter data queue organization and/or destination to move data towards hardware with known origins. Hence, the identification of hardware origin can correspond with manipulation of NVMe configuration and/or operation to take advantage of known operating parameters of hardware to provide increased performance, efficiency, reliability, security, and/or consistency.

Through the assorted circuitry of the hardware module 170 an optimization strategy can be generated, updated, and executed to increase performance, reliability, and/or consistency of a distributed data storage system. The identification of the origin of hardware can inform the optimization strategy to what hardware to keep in a dormant, or throttled, state and what tasks to assign to various aspects of a distributed data storage system. As a result, passively or actively identifying hardware origin can be utilized to optimize the diversion of system tasks, NVMe operation, and satisfaction of host-generated data access requests.

Figure 6:
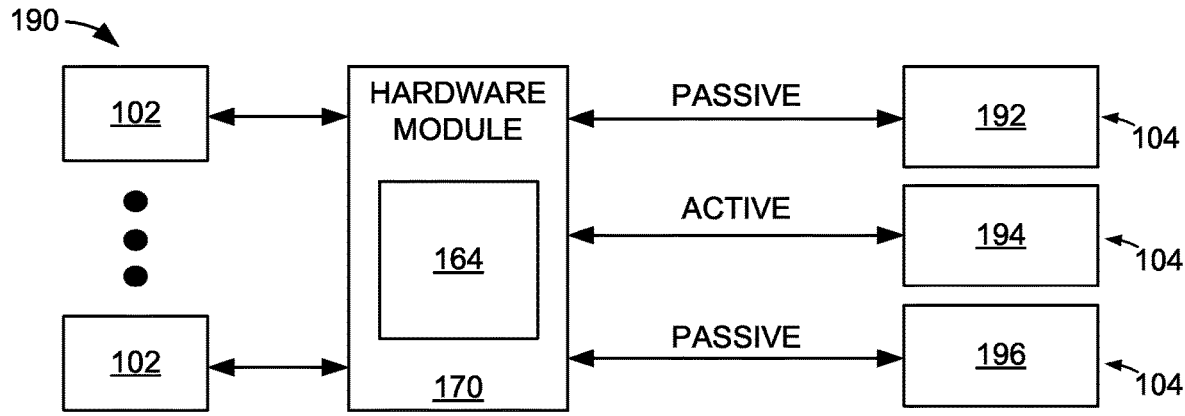
FIG. 6 depicts a block representation of portions of an example data storage system utilized in accordance with various embodiments.

FIG. 6 depicts a block representation of portions of an example distributed data storage system 190 that utilizes a hardware module 170 to evaluate and identify the manufacturing origin of hardware. The system 190 can have any number of hosts 102 connected to any number of data storage devices 104 through network component and the circuitry of the hardware module 170. The devices 104 can have similar, or dissimilar, configurations, such as memory type, capacity, speed, reliability, and origin.

In the non-limiting example of FIG. 6, a first data storage device 192 has previously been connected and utilized by the system 190 without having an origin evaluation. Meanwhile, a new data storage device 194 is connected to the system and a third data storage device 196 has had less than all of its hardware origin identified. The hardware module 170 can intelligently determine how and when the various unidentified hardware of the system 190 are identified. It is noted that the data storage system 190 can operate for any amount of time with unidentified constituent hardware.

In accordance with various embodiments, the hardware module 170 can decide if hardware origin evaluation will be passive or active. A passive origin identification involves monitoring hardware activity over time during the execution of commands, requests, and tasks not specifically directed to origin identification. That is, passive origin evaluation does not generate any specific commands or requests to determine hardware origin and, instead, monitors satisfaction of general device 104 activity for operational parameters that indicate hardware origin. For instance, passive identification can monitor one or more operational metrics, such as power consumption, latency, overall time to completion, and maximum speed, along with operational configurations, such as generated error correction code, parity, metadata, and encryption, to determine what manufacturer created the hardware.

The correlation of passively attained operational activity of hardware can accurately identify what manufacturer created the hardware due to understood manufacturer behavior and/or performance that is unique. For example, evaluation of the latency of assorted data access requests to a memory can indicate the manufacturer (origin) of the memory, a device bus, or signal channel. It is contemplated that multiple different aspects of hardware operation can be utilized to identify the origin of hardware. Some embodiments initially predict the origin of hardware and subsequently discover operational activity that confirms, or negates, the predicted origin.

The passive identification of the origin of hardware can be less processing intensive than active origin testing, but can take greater time as the hardware module 170 may wait for commands and/or requests to provide information that can be used to identify hardware origin. In contrast, active origin identification can be faster, and potentially more accurate than passive identification, but at the cost of greater processing burden on the system 190. That is, active hardware origin identification involves a unique testing procedure where operational aspects of hardware are evaluated independently from commands, requests, and tasks generated by other aspects of the system 190. Active origin identification can generate data, commands, and signals to sequentially, or redundantly, poll the operational performance and/or capabilities of hardware, which indicates which manufacturer released the hardware for end-user use.

The non-limiting example of FIG. 6 illustrates how the hardware module 170 can conduct different origin identification protocol for different aspects of a data storage system 190. The intelligent evaluation of available system 190 capabilities with respect to pending data access requests, system tasks, and logged device 104 behaviors allows the hardware module 170 to select an origin identification protocol that operates without degrading average data access performance over time, which provides a seamless origin identification to a connected host 102. In other words, the hardware module 170 can choose and adapt how hardware origin is identified to ensure average data access performance, such as latency and time to completion, does not decrease while hardware is evaluated. The ability to adapt to different protocol in response to changing conditions further enables the hardware module 170 to intelligently recognize the origin of hardware and optimize the connection of known, trusted devices.

Through the recognition of hardware origin, the hardware module 170 can identify opportunities for operational optimizations that take advantage of known aspects of hardware from trusted manufacturers. The intelligent use of active or passive hardware origin identification without degrading system performance begins system optimization that leverages known aspects of hardware origin to increase capabilities and performance over time. One such optimization can be the diversion of system tasks to hardware with known origins that can satisfy both assigned tasks and host-generated data access requests without degrading average system performance.

Figure 7:
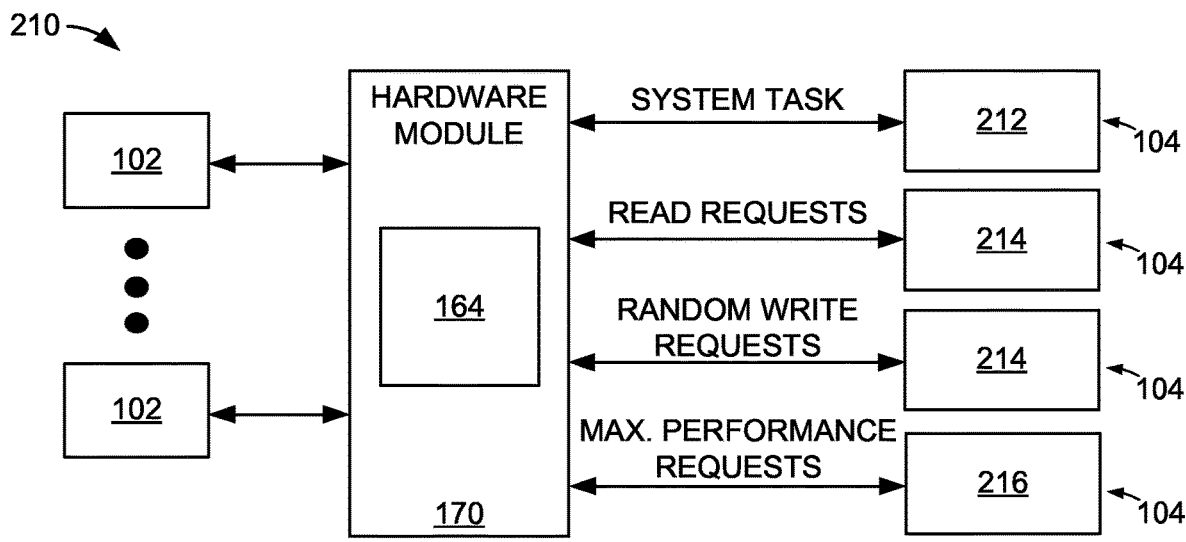
FIG. 7 depicts a block representation of portions of an example data storage system employed in accordance with assorted embodiments.

FIG. 7 depicts a block representation of portions of an example distributed data storage system 210 that intelligently assigns system tasks to downstream data storage devices 104 in response to identified hardware origins. The identification of hardware origin allows the hardware module 170 to generate one or more optimization strategies that prescribes how and when known, trusted hardware can be utilized for various system tasks. In the non-limiting example system 210, a first data storage device 212 has hardware with known origin while devices 214 have unknown hardware origin and device 216 has a hardware origin predicted by the hardware module 170 in response to system 210 activity.

Although some, or all, of the hardware of the first device 212 may have known origins, the hardware module 170 can divert one or more system tasks to the device 212 for completion along with host-generated data access requests.

A task may be diverted from other data storage devices 104 or upstream network components. The type, complexity, and duration of a system task diverted to the first device 212 is not limited and may involve generation of data, such as error correction code assignment, parity data creation, metadata assignment, or data mapping, or involve actions, such as data rebuilding, security verification, encryption of data, or background data operations. With the knowledge of the origin of hardware for the first device 212, the assigned task(s) can pass to the device 212 without upstream processing or alteration, such as data compression, encryption, or protection which would be conducted if the hardware origin was unknown.

In comparison, for the data storage devices 214 with unknown hardware origins, the hardware module 170 tasks may be diverted from other system components, but with additional handling operations that ensure the destination device 214 has sufficient data, formatting, and information to complete the assigned task. In other words, the knowledge of the hardware origin of a device allows tasks to be assigned that utilize the known operating capabilities, performance, and protocol to reduce the volume of upstream processing necessary to complete the task. It is contemplated that devices 214 with unknown hardware are not assigned tasks and, instead, are assigned particular types of data access requests that can be conducted with minimal security and other processing intensive overhead operations. For instance, devices 214 with unknown hardware can be assigned sequential writes, sequential reads, random writes, random reads, writes above a selected size, or writes for data believed to be infrequently accessed.

The assignment of selected tasks and types of data access requests can follow a prescribed optimization strategy generated by the hardware module 170. The strategy may further prescribe how to manage connections with hardware with predicted origins to provide heightened data access performance, reliability, and/or security. Some embodiments of an optimization strategy utilize hardware with a predicted origin for maximum data access performance. For instance, the hardware module 170 may assign particular types of data accesses, data, and/or system tasks to the device 216 that provide the best possible speed, error rate, latency, or consistency. Such assignment can also be conducted for known hardware, but use of predicted hardware origin for maximum data access performance can mitigate the risk to data security by employing low security level data.

The parallel connections of the respective data storage devices can, in some embodiments, allow for concurrent processing and satisfaction of data accesses and system tasks. It is contemplated that system tasks can be selected by the hardware module 170 to capitalize on known hardware capabilities, which can produce lower volumes of task/data processing for upstream system components while known/predicted hardware origins are utilized for known protocol, procedure, and limits to provide customized operation that optimizes system performance, reliability, and/or security.

The recognition of the origin of hardware for a system component can be particularly advantageous in large-scale distributed data storage systems where numerous devices are regularly changed so that new devices are initialized, verified for security purposes, and sources of system tasks. The deactivation of some hardware aspects of a system can provide dormant capabilities that can be selectively activated upon operational triggers, such as recognition of a hardware's origin, to fulfill the known, trusted capabilities of the connected hardware. The intelligent identification of hardware that can be dormant may be undertaken by the hardware module in response to various prompts, such as a consistent average system performance or reduction in system processing demand over time.

Figure 8:
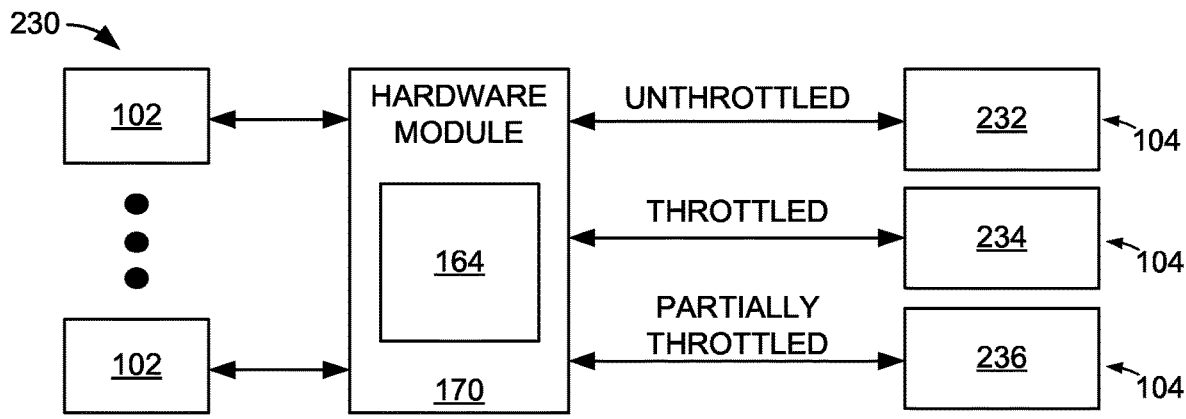
FIG. 8 depicts a block representation of portions of an example data storage system carrying out various embodiments.

Assorted embodiments of the hardware module 170 can, alternatively or additionally, place various hardware aspects in a throttled condition that allows for burst performance capabilities upon transition to an unthrottled state. FIG. 8 depicts a block representation of portions of an example distributed data storage system 230 that employs a hardware module 170 to carry out an intelligent throttling of hardware in accordance with an optimization strategy. It is noted that throttling of hardware is not limited to a particular mechanism and can be accomplished by manipulating data and by manipulating how hardware operates. For instance, hardware can be throttled to operate at less than a maximum capability by inserting time delays, overloading a queue/buffer, reducing electrical power, processing intensive data, and scheduling completion of system tasks in conjunction with host-generated data access requests.

The example distributed data storage system 230 can have any number of hosts 102 connected any number of data storage devices 104 via the hardware module 170. As shown, a first data storage device 232 has a known hardware origin, a second data storage device 234 has an unknown hardware origin, and a third data storage device 236 has an unknown, but predicted, hardware origin. In response to the identification, or prediction, of hardware origin, the hardware module 170 can generate an optimization strategy that prescribes what hardware to keep in a dormant state and what hardware to throttle along with the parameters of throttling, such as how long, how much, and when to remove throttling conditions.

As a non-limiting functional example, the optimization strategy can prescribe keeping hardware for the known device 232 unthrottled while throttling both devices 234/236 that have unknown/predicted hardware origins. The use of unthrottled hardware can maximize the potential of the known hardware while throttling unknown/predicted hardware protects the system's ability to consistently provide data security, reliability, and performance. That is, throttling unknown hardware provides an operational buffer to account for unknown operational capabilities, protocols, and limits to maintain a performance and reliability consistency over time, such as error rate, time to completion, latency, and availability.

In some embodiments, the optimization strategy prescribes different aspects of hardware to be throttled. For instance, output of a memory array may be throttled for the unknown device 234 while input of a bus or port may be throttled for the predicted hardware origin device 236. It is contemplated that different hardware aspects of a single device can be throttled differently while in combination. The ability to utilize different manners of throttling for assorted different aspects of hardware allow the hardware module 170 to adapt how a device is throttled to provide a consistent range of operating parameters, such as latency or overall time to request completion. In other words, the hardware module 170 can choose a throttled operating range, in accordance with the optimization strategy, and adapts how a device is throttled to maintain operation within the designated range.

An optimization strategy, in other embodiments, alters how a device is throttled over time. For example, the optimization strategy can prescribe more, or less, operational throttling below a maximum hardware operational capability over time, which enables the hardware module 170 to make necessary system 230 adaptations to maintain data reliability and request completion performance. The proactive generation of the optimization strategy allows for efficient pivoting of operational conditions to maintain system 230 performance while providing data security and reliability.

The optimization strategy can provide one or more triggers that correspond with changes to how a device is throttled. For instance, the strategy can set one or more operational events, such as identifying hardware origin, reaching a performance threshold, or connection of additional devices, that correspond with changing or eliminating the throttling of a device. The presence of throttled hardware in the system 230 further allows the hardware module 170 to selectively go into a burst mode where previously throttled hardware is unthrottled to carry out a selected task and/or host-generated request with maximum performance capability.

Figure 9:
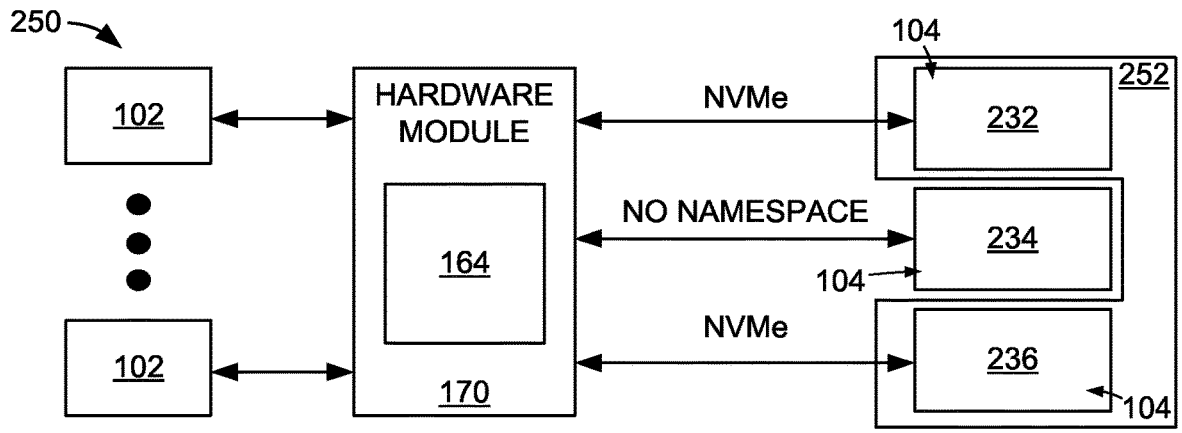
FIG. 9 depicts a block representation of portions of an example data storage system utilized in accordance with some embodiments.

FIG. 9 depicts a block representation of portions of an example distributed data storage system 250 in which a hardware module 170 executes an optimization strategy in response to a detected identification of the origin of system hardware. Carrying forward the non-limiting example data storage devices from system 230, a first device 232 has a known hardware origin, a second device 234 has an unknown hardware origin, and a third device 236 has an unknown, but predicted, hardware origin. It is contemplated, but not required, that portions of the system 250 operate with an NVMe protocol with, or without, an identified hardware origin.

A generated optimization strategy can prescribe the establishment, alteration, or elimination of various NVMe settings and configurations to provide desired system performance. For the example system 250 of FIG. 9, the optimization strategy prescribes logically combining the known and predicted hardware devices 232/236 into a single namespace 252. It is contemplated that the optimization strategy prescribes alterations to how NVMe protocol is conducted, such as buffering/caching scheme, pending request execution order, and random/sequential data accesses.

The generation and maintenance of NVMe configurations in an optimization strategy allows for dynamic configurations that increase system performance and/or reliability. Various embodiments of the optimization strategy arrange NVMe operation to defer processing activity downstream to hardware with known/predicted capabilities, protocol, restrictions, and limits. The optimization strategy, in other embodiments, removes some devices from NVMe operation, which can correspond with an assigned function, such as a queue for other devices that utilize NVMe protocol. As another non-limiting example, the optimization strategy can configure NVMe operation to provide specific performance, such as satisfaction of deterministic windows where performance consistency in a selected range, or above a specific threshold, is maintained for a guaranteed amount of time.

Figure 10:
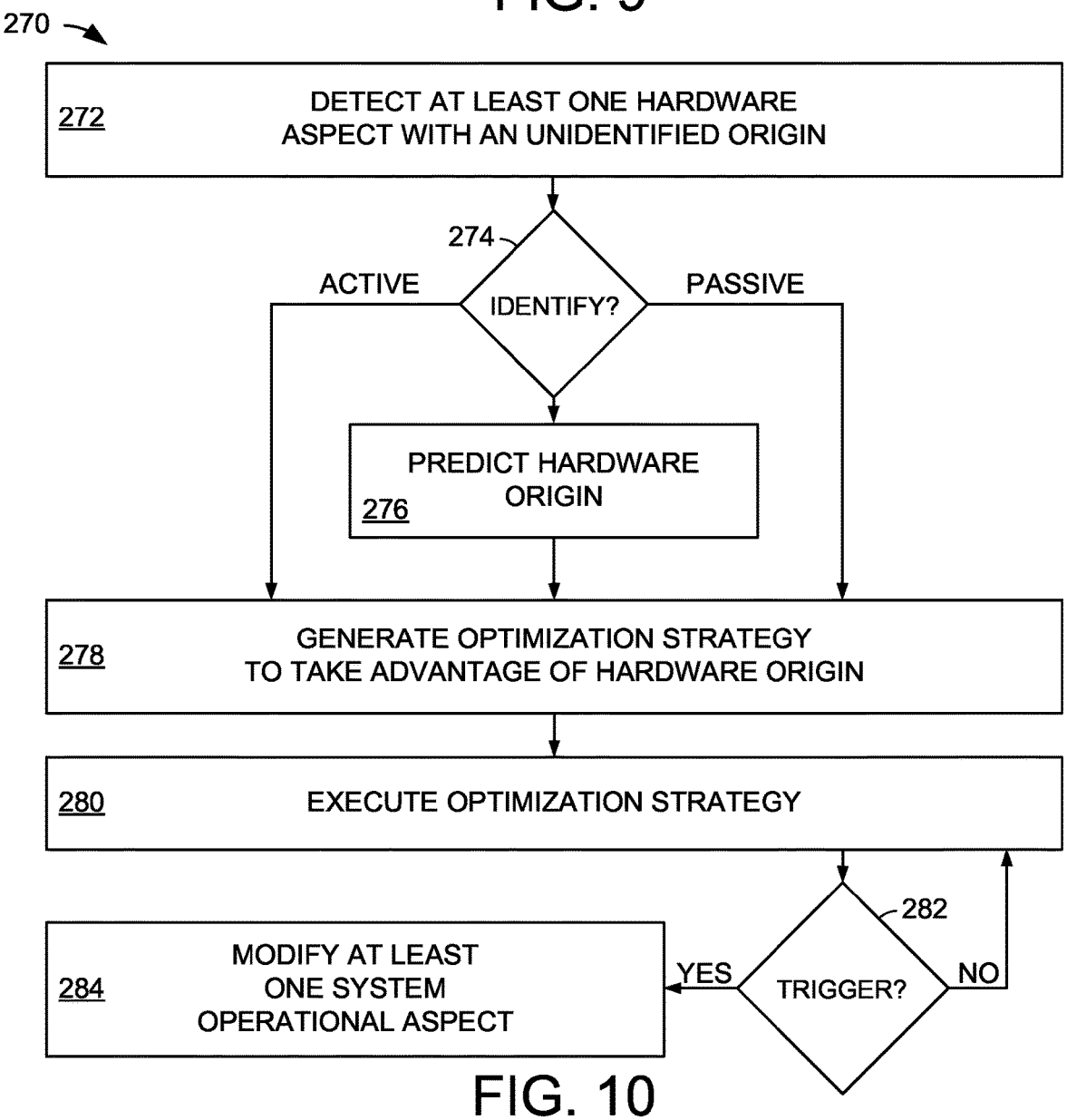
FIG. 10 is a flowchart of an example hardware routine the can be executed with the respective data storage systems of FIGS. 1-9 in assorted embodiments.

FIG. 10 flowchart of an example optimization routine 270 that can be carried out with assorted embodiments of the distributed data storage systems in FIGS. 1-9. Upon connection of various hosts to data storage devices via a hardware module, step 272 detects at least one hardware aspect that has an unidentified origin. The hardware module proceeds, in decision 274, to determine if, how, and when, hardware is to be identified. For instance, decision 274 can evaluate if active testing of hardware or if passive activity monitoring for hardware identification provides desired system performance, reliability, and security. That is, decision 274 can compare the real-time capabilities of the system with the requirements of active and passive hardware origin identification to determine when and how hardware origin can be determined without degrading system averages.

Alternatively, decision 274 can determine that system resources cannot maintain desired levels over time by conducting either passive or active hardware origin evaluation. As such, decision 274 prompts step 276 to predict the origin of hardware with the hardware module based on logged and/or model system information. The detection, or prediction, of the origin of hardware allows the hardware module to generate an optimization strategy in step 278 that seeks to utilize the known aspects of hardware to provide increased consistency, reliability, security, and/or performance.

At any time, the hardware module can begin executing the optimization strategy in step 280 to alter and/or create functional aspects of the distributed data storage system to take advantage of the identified origin of hardware. For instance, step 280 can activate previously dormant hardware, deactivate some hardware to a dormant state, throttle hardware to an artificially reduced operational capacity, assign a system task, establish an NVMe condition, or reconfigure an NVMe condition. It is contemplated that step 280 can be conducted any number of times to carry out portions of an optimization strategy with any number, and type, of different operational alterations.

After the strategy actions are conducted in step 280, decision 282 can evaluate is a predetermined operational trigger is present, imminent, or predicted. That is, the optimization strategy can prescribe one or more operational triggers, such as number of connected devices, data access latency, error rate, volume of pending commands/tasks/requests, or available processing capability, that corresponds with alteration of at least one operational aspect of the distributed data storage system in step 284. Although not required or limiting, step 284 may respond to an operational trigger by unthrottling hardware, activing previously dormant hardware, pausing execution of a system task, or changing an NVMe configuration.

Through the execution of routine 270, the intelligent identification of hardware origin can be leveraged into optimized system functionality by taking advantage of the capabilities of hardware originating from known, trusted manufacturers. The knowledge of the origin of hardware corresponds with an understanding of the default protocol, settings, and restrictions along with the processing, data storage, power, and security capabilities, which allows a hardware module to intelligently activate, unthrottle, and utilize hardware to conduct system tasks in conjunction with host-generated data access requests to maintain, or increase, average system performance, data reliability, and security.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
    connecting a host to a device and a hardware module;
    identifying an origin of the device with the hardware module;
    activating a previously dormant hardware aspect of the device in response to the identified origin; and utilizing the activated hardware aspect to execute a task assigned by the hardware module.

2. The method of claim 1, wherein the origin is identified passively while the device satisfies a host-generated data access request.

3. The method of claim 1, wherein the origin is identified by monitoring satisfaction of a host-generated data access request.

4. The method of claim 1, wherein the origin is identified by polling the device and receiving a predetermined origin identifier.

5. The method of claim 1, wherein the hardware module generates a pattern of test commands to identify the origin of the device.

6. The method of claim 1, wherein the origin of the device is a manufacturer.

7. A method comprising:
connecting a host to a device and a hardware module;
satisfying at least one host-generated data access request with the device;
setting a bus channel of the device as dormant, as directed by the hardware module;
identifying an origin of the device with the hardware module during the satisfaction of the at least one host-generated data access request;
activating the previously dormant bus channel of the device in response to the identified origin; and
utilizing the bus channel to execute a task assigned by the hardware module.

8. The method of claim 7, wherein the task is conducted only by the previously dormant bus channel.

9. The method of claim 7, wherein the task involves executing a cryptographic function on data stored in the device.

10. The method of claim 7, wherein the task involves assigning error correction code to data storage in the device.

11. The method of claim 7, wherein the task is executed concurrently with the satisfaction of host-generated data access requests to the device.

12. The method of claim 7, wherein the task involves upgrading firmware to the device.

13. The method of claim 7, wherein the task involves rebuilding data on the device.

14. The method of claim 7, wherein the task involves initializing a new device and skipping a scheduled initialization operation in response to a recognized origin of the new device by the hardware module.

15. The method of claim 7, wherein the dormant bus channel is capable of transferring signals while being dormant.

16. A method comprising:
connecting a host to a device and a hardware module;
satisfying at least one host-generated data access request with the device;
throttling a portion of the device to less than an operational maximum of the device, as directed by the hardware module;
identifying an origin of the device with the hardware module during the satisfaction of the at least one host-generated data access request;
unthrottling the device to provide the operational maximum while executing a task assigned by the hardware module.

17. The method of claim 16, wherein the task involves adjusting a namespace configuration for the device.

18. The method of claim 16, wherein the task involves changing a buffer scheme assigned to the device.

19. The method of claim 16, wherein the task involves altering a queue arrangement for the device.

20. The method of claim 16, wherein the throttled portion of the device has at least one deliberately reduced operational parameter.

* * * * *